United States Patent Office 3,505,209
Patented Apr. 7, 1970

3,505,209
CATALYTIC HYDROCRACKING AND
DESULFURIZATION PROCESS
Charles C. Brewer and Charles R. Killian, Baton Rouge,
La., assignors to Foster Grant Co. Inc., Leominster,
Mass., a corporation of Delaware
No Drawing. Filed Feb. 20, 1968, Ser. No. 706,806
Int. Cl. C10g 13/10
U.S. Cl. 208—112
12 Claims

ABSTRACT OF THE DISCLOSURE

A feed stock of vinyl aromatic distillation residues which may be mixed with aromatic alkylation residues is subjected to hydrocracking and hydrodesulfurization by the use of a catalyst which may be a mixture of oxides of molybdenum and cobalt, molybdenum and nickel, or molybdenum, cobalt and nickel, and a carrier such as alumina.

---

This invention relates generally to the catalytic hydrocracking and hydrodesulfurization of distillation residua which result from the production of vinyl benzene compounds, such as styrene, vinyltoluene, ethylvinylbenzene, and divinylbenzene. More particularly, this invention relates to the catalytic hydrocracking and hydrodesulfurization of the distillation residue from the alkylation of benzene and alkylbenzenes, such as toluene and ethylbenzene, with ethylene to produce alkylbenzenes, such as ethylbenzene, methylethylbenzene and the dehydrogenation of the alkylbenzenes to produce vinylbenzenes, such as styrene, vinyltoluene, ethylvinylbenzene, and divinylbenzene. The process of this invention converts a substantial amount of distillation residues which have very low if any economic value to valuable aromatic compounds.

In a widely used method for the production of vinylbenzenes, benzene and alkylbenzenes, such as toluene, are alkylated with ethylene by the use of Friedel-Crafts type catalysts or other alkylation catalysts, such as alumina. The product from the alkylation reaction is removed by distillation at reduced pressure until all mono-, di-, and tri- and some tetrasubstituted benzene compounds have been removed. In the production of ethyl benzene, the distillation is stopped when the temperature is about 150° F. at a pressure of about 25 mm. of mercury. This residue comprises a mixture of polymethly and polyethylbenzenes, as well as aromatic compounds, such as indanes, naphthalenes, diphenyls, acenaphthalenes, and phenanthrenes. This distillation residue is generally only suitable for use as fuel oil.

The product from the alkylation step is catalytically dehydrogenated to provide vinylbenzenes, such as styrene, vinyltoluene, ethylvinylbenzene, and divinylbenzene. The crude product from the dehydrogenation step is sensitive to polymerization and elementary sulfur is added to the stream coming from the dehydrogenation reactor as a polymerization inhibitor. About 0.15% by weight of sulfur is added to the crude dehydrogenation product. This amount of sulfur is soluble in the dehydrogeneration product and is effective in the prevention of polymerization during the distillation of the steam from the dehydrogenation reaction. The distillation is continued until all of the mono- and disubstituted and some trisubstituted benzene compounds have been removed. In the production of styrene, the distillation is stopped when the bottom temperature is about 230° F. at a pressure of about 30 mm. of mercury. The distillation residue contains about 10% sulfur which is present as elemental sulfur, as well as in the form of alkyl sulfides, mercaptans, and other forms of chemically combined sulfur. The amount of residue from the vinyl benzene distillation varies from about 2% to about 5% of the styrene produced. The residue is a highly viscous tarry material and is a complex mixture of monomeric compounds, some of which contain combined sulfur, and polymeric compounds which have a molecular weight as high as about 35,000 which contain some unsaturation. The monomeric compounds are present in both unsaturated and saturated forms. The monomeric substances include small amounts of polyalkylbenzenes, such as polymethyl and polyethyl benzenes, diphenyl, and substituted diphenyls, and fused ring compounds such as indanes, indenes, napthalenes, acenaphthalenes, and phenanthrenes. This distillation residue is discarded or burned.

The residue from the distillation of the dehydrogenation product may be subjected to the hydrocracking and hydrodesulfurization process in undiluted form. However, the distillation residue from the dehydrogenation is preferably combined with the distillation residue from the alkylation process. The distillation residue from the alkylation product is only slightly viscous and when it is combined with the highly viscous distillation residue from the dehydrogenation process, a feed stock results which may be easily handled. Also, when the combination of distillation residues is used, the recovery of mono- and disubstituted benzene compounds is improved. The composition of the mixture may vary over the range of from about 20 to 80% of styrene distillation residue and from about 80 to 20% of alkylation distillation residue. The feed stock is passed into a reactor, preferably at an elevated temperature, such as at a temperature from about 300° to about 600° F., and is mixed with hydrogen as it enters the reactor. The amount of hydrogen mixed with the feed stock is at least an amount which is sufficient to saturate the hydrocarbon components of the feed stock and convert all of the free and chemically combined sulfur to hydrogen sulfide. The mixture of feed stock and hydrogen is passed through a bed of hydrocracking and hydrodesulfurization catalyst which is maintained at a temperature of from about 600° F. to about 1100° F. If the temperature of the catalyst bed is below about 600° F., the reaction rate is undesirably low and if the temperature of the catalyst bed is above about 1100° F., an excessive amount of carbon is formed as a result of the cracking of the hydrocarbon components of the feed stock, which decreases the catalyst activity. The pressure within the reactor is maintained within the range of from about 100 to about 500 p.s.i.g. If the pressure is below about 100 p.s.i.g., the hydrocracking and hydrodesulfurization reactions do not go to the desired completion because the partial pressure of hydrogenation is too low. If the pressure is greater than about 500 p.s.i.g., there is excessive cracking of the hydrocarbon components of the feed stock, which results in carbon formation and a shortened life of the catalyst. The feed stock is passed through the catalyst bed at a rate of from about 0.2 to about 3.0 pounds of feed stock per pound of catalyst per hour. If the rate is below about 0.2 pound of feed stock per pound of catalyst per hour, the process is inefficient and uneconomical. If the rate is greater than about 3.0 pounds of feed stock per pound of catalyst per hour, the hydrocracking and hydrodesulfurization reactions are incomplete and this results in a low conversion and a low yield of saturated aromatic compounds.

The end products of the hydrocracking and hydrodesulfurization reactions are hydrogen sulfide and a low viscosity liquid which contains not more than about ten parts per million of sulfur. The hydrogen sulfide may be used as such or may be utilized in the production of oxides of sulfur or elemental sulfur. The liquid stream may be degassed and fractionally distilled. By distilling the degassed stream to a temperature of up to 165° C. at atmospheric pressuse, a distillate is obtained which contains utilizable materials, such as benzene, toluene, xylenes, ethylbenzene, methylethylbenzene and diethylbenzene. The distillate may be recycled to the alkylation reaction or further fractionated to provide substantially pure components. The residue from the distillation is composed largely of polyalkylbenzenes and saturated polymeric materials and may be used as fuel oil.

The hydrocracking and hydrodesulfurization catalysts suitable for use in the practice of this invention are oxides of metals, such as cobalt, nickel, and molybdenum which are supported on a material, such as alumina. The preferred catalysts contain a combination of cobalt and molybdenum oxides, a combination of nickel and molybdenum oxides, and a combination of cobalt and molybdenum oxides promoted by nickel oxides.

The catalysts which may be used in the process of this invention are cobalt-molybdenum oxides, nickel oxide promoted cobalt-molybdenum oxides, or nickel-molybdenum oxides on a support material, preferably alumina, and are prepared in general by adding a controlled amount of strong acid to a mixture of the metallic compounds and a carrier, such as alumina. Sufficient water is added to reduce the mixture to a somewhat fluid consistency suitable for extrusion and the batch is passed through a suitable die, preferably of stainless steel, to form shaped extrudates. The extruded material is then dried and/or calcined at high temperature to drive off the water and convert the metallic compounds to oxides supported on the carrier.

More particularly, the preferred method of catalyst manufacture comprises mixing alumina hydrate and molybdenum oxide with an aqueous solution of a cobalt salt or with a nickel salt or with a mixture of cobalt and nickel salts, which are convertible to cobalt oxide and nickel oxide upon calcination. In the preferred mixing procedure, the molybdenum oxide, cobalt and nickel compounds are dispersed uniformly throughout the alumina and a damp solid mixture is formed. Then a strong mineral acid, such as nitric acid, hydrochloric acid or sulfuric acid, is added in a controlled amount to convert the damp solid into an extrudable paste. When the acid nitric acid, the amount of acid selected should be at least 2.5% by weight of commercial concentrated (63%) acid, based on the total weight of the finished product, 5% to 10% being the preferred range. The amount of concentrated acid can exceed 10% by weight, as the excess is removed during calcination, but for reasons of economy such an excess is usually undesirable. With other mineral acids, mole equivalent quantities of acid are selected. Sufficient water is added to the mixture, simultaneously and/or subsequently, to form an extrudable paste and the catalyst mixture is passed through a die or other apparatus to form extrusions. The amount of water used in preparing the extrudable paste is selected with regard to the consistency of the mixture after the acid has been added. A certain amount of water is added with the acid and the additional water which may be required to produce an extrudable mass is selected by simple experimentation to achieve a paste of the proper consistency. The extrusions are calcined at a temperature such that the moisture is evaporated, the salts of cobalt and nickel are decomposed, the alumina is partially dehydrated, and the extrusions are converted into hard catalyst pellets which have great physical strength and will withstand repeated regeneration without appreciable deterioration.

Certain variations from the above-described preferred procedure may be employed if desired. For example, if the compounds utilized are compatible with the acid used, the acid addition may be made simultaneously with the cobalt and nickel compounds. Moreover, it is not necessary that the acid be highly concentrated at the time of addition and, if desired, all or some of the water added to adjust the composition to an extrudable paste may be mixed with the acid prior to addition of the acid to the mixture.

The carrier or support material used in forming the extruded catalyst according to this invention is alumina, preferably a hydrated alumina, such as that containing approximately equal proportions of beta-$Al_2O_3 \cdot 3H_2O$ and alpha-$Al_2O_3 \cdot H_2O$, which upon calcination at a temperature within the range of from 700° to 900° F. is converted largely to gamma-$Al_2O_3$. Other hydrated aluminas, such as alpha-$Al_2O_3 \cdot 3H_2O$, as well as calcined or otherwise dehydrated alumina can be used in producing the catalyst. During the calcination of the extruded alumina catalyst, high temperatures should be avoided or "dead burned" alumina may result. The preferred calcining temperature is in the range of 600° to 1,000° F. although higher temperatures not exceeding the sublimation temperature (approximately 2,300° F.) of molybdenum trioxide be used.

When the catalyst is a cobalt-molybdenum or nickel-molybdenum oxide mixture, the atomic ratio of cobalt to molybdenum and nickel to molybdenum may vary from 1 to 5 to 1 to 1. When the catalyst is a nickel oxide promoted cobalt-molybdenum oxide mixture, the atomic ratio of the combined nickel and cobalt to the molybdenum may vary from 1 to 5 to 1 to 1. The relative quantities may be controlled by adjusting the amounts of molybdenum oxide and nickel and cobalt salts used in the initial steps of the catalyst manufacture. The cobalt salt and nickel salt may be any cobalt or nickel salt which is soluble in water and convertible to the oxide upon calcination, such as cobalt or nickel chlorides, cobalt or nickel nitrates and cobalt or nickel sulfates. The pH of the solution must be less than about 7 or the cobalt and nickel salts may precipitate early. The amounts of catalytically active materials in the finished catalyst should usually be as small as possible consistent with the required activity to accomplish the desired reaction. Generally speaking, the amount of cobalt and molybdenum in the cobalt-molybdenum catalyst will fall within the range of: cobalt as CoO—1 to 5% by weight, molybdenum as $MoO_3$—2 to 20% by weight. The amounts of nickel and molybdenum in the nickel-molybdenum catalyst will fall within the range of: Nickel as NiO—1 to 5% by weight, molybdenum as $MoO_3$—2 to 20% by weight. The amounts of nickel, cobalt, and molybdenum in a nickel oxide promoted cobalt-molybdenum oxide mixture will fall within the range of: Cobalt as CoO plus nickel as NiO—1 to 5% by weight, molybdenum as $MoO_3$—2 to 20% by weight. The remainder of the catalyst is carrier.

Methods for preparing four different catalysts suitable for use in the process of this invention are given below. However, these catalysts are presented only by way of illustration of catalysts which may be used in the successful carrying out of the hydrocracking and hydrodesulfurization process of the appended claims.

CATALYST NO. 1

A mixture of 100 lbs. of hydrated alumina (27% water) and 9 lbs. of molybdenum trioxide is dry mulled for approximately 20 minutes. The hydrated alumina comprises approximately equal proportions of beta-$Al_2O_3 \cdot 3H_2O$ and alpha-$Al_2O_3 \cdot H_2O$. Then 26.5 lbs. of an aqueous solution of cobalt nitrate (sp. gr. 1.196) containing 1.8 lbs. of CoO is added and the mixture is wet mulled for approximately 10 minutes. The cobalt nitrate solution is prepared by dissolving cobalt metal in dilute nitric acid and controlling the excess of acid so that not more than 2% free acid are present. Next 2.5 lbs. of nitric acid (63%) diluted with water are added and wet mulling is continued. Additional water (approximately 4.5 gal.) is added to give a paste of proper consistency for extrusion. The catalyst paste is then extruded through a 3/16 inch stainless steel die and the extrusions are calcined for one hour at 400° F., one hour at 650° F. and six hours at 950° F. The catalyst thus formed shows an analysis of 2.5% CoO and 12.0% $MoO_3$. It has a side crush strength of 29 lbs. dead weight load (DWL), an abrasion loss of only 5.05% and a bulk density of 45.4 lbs. per cubic foot.

CATALYST NO. 2

A mixture of 22 lbs. of hydrated alumina (27% water) and 2 lbs. of molybdenum trioxide is dry mulled for approximately 20 minutes. The hydrated alumina comprises approximately equal proportions of beta-$Al_2O_3 \cdot 3H_2O$ and alpha-$Al_2O_3 \cdot H_2O$. Then 91.5 ml. of an aqueous solution of cobalt nitrate (sp. gr. 1.530) and 9.65 ml. of an aqueous solution of nickel nitrate (sp. gr. 1.546) are added and the mixture is wet mulled for approximately 10 minutes. The cobalt nitrate solution was prepared by dissolving cobalt metal in dilute nitric acid and controlling the excess of acid so that not more than 2% free acid are present. Next 340 ml. of 63% nitric acid are added and wet mulling is continued. Additional water (approximately 910 ml.) is added to give a paste of proper consistency for extrusion. The catalyst paste is then extruded through a 3/16 inch stainless steel die and the extrusions are calcined for one hour at 400° F., one hour at 650° F., and six hours at 950° F. The catalyst thus formed shows an analysis of 2.33% CoO, 2.81% NiO, and 9.25% $MoO_3$.

CATALYST NO. 3

A cobalt-nickel-molybdenum-alumina extruded catalyst is prepared from the following materials:

| | Parts |
|---|---|
| NiO (as nickel nitrate solution) | 37.5 |
| CoO (as cobalt nitrate solution) | 50.0 |
| $MoO_3$ | 300 |
| Alumina hydrate | 2850 |
| Nitric acid (63%) | 62.5 |

The alumina and molybdenum trioxide are dry mulled together for ten minutes. The cobalt nitrate and nickel nitrate solutions are added followed by the nitric acid (equivalent to 2.5% by weight of the finished product) and wet mulling is continued for a period of 2 hours. Then the consistency of the paste is adjusted by the addition of water to form an extrudable product which is extruded through a 3/16 inch die. The extruded material is calcined for one hour at 450° F., one hour at 650° F., and six hours at 950° F. On analysis the catalyst contains 1.9% CoO, 1.5% NiO, and 11.2% $MoO_3$.

CATALYST NO. 4

A nickel-molybdenum-alumina extruded catalyst is prepared from the following materials:

| | Parts |
|---|---|
| NiO (as nickel nitrate solution) | 87.5 |
| $MoO_3$ | 300 |
| Alumina hydrate | 2850 |
| Nitric acid (63%) | 62.5 |

The alumina and molybdenum trioxide are dry mulled together for ten minutes. The nickel nitrate solution is added followed by the nitric acid (equivalent to 2.5% by weight of the finished product) and wet mulling is continued for a period of two hours. Then the consistency of the paste is adjusted by the addition of water to form an extrudable product which is extruded through a 3/16 inch die. The extruded material is calcined for one hour at 450° F., one hour at 650° F. and six hours at 950° F. On analysis the catalyst contains 3.4% NiO, and 11.2% $MoO_3$.

The following examples, which illustrate the hydrocracking and hydrodesulfurization process of this invention, are given for the purpose of illustrating the invention but are not to be construed as limiting it in scope. It will be readily appreciated by those skilled in the art that numerous modifications in conditions, concentrations, relative quantities of materials, and the like may be made without departing from the invention.

Example 1

Tar residue from the distillation up to a temperature of 250° F. at 30 mm., of mercury of crude styrene from the catalytic dehydrogenation of ethylbenzene, is heated to 300° F. and pumped into the top of the reactor. Hydrogen is also introduced at the top of the reactor and mixed with the tar. The mixture of the tar and hydrogen is passed through a bed of Catalyst No. 2 at a rate such that 0.41 pound of tar per hour per pound of catalyst and 24.6 standard cubic feet of hydrogen per pound of tar pass through the reactor. The average catalyst temperature is 750° F. and any heat required to keep the catalyst up to temperature, which is not provided by the heat of reaction, is supplied by electrical heating elements about the catalyst case. The total pressure within the reactor is 300 p.s.i.g. The reaction product is removed from the reactor at such a rate that the pressure within the reactor is maintained at the above level.

The liquid product represents approximately 93% of the hydrocarbon content of the tar and contains not more than ten parts per million of sulfur.

The product is degassed and distilled up to 165° C. at 760 mm. of Hg.

Example 2

The procedure of Example 1 is repeated except that the amount of hydrogen is decreased to 18.3 standard cubic feet per pound of tar and the average catalyst temperature is 825° F.

The product represents 94.5% of the hydrocarbon content of the tar and contains not more than ten parts per million of sulfur.

Example 3

The procedure of Example 1 is repeated except that the amount of hydrogen is increased to 31.0 standard cubic feet per pound of tar and the average catalyst temperature is 925° F.

The product represents 92% of the hydrocarbon content of the tar and contains not more than ten parts million of sulfur.

Example 4

The procedure of Example 1 is repeated except that the amount of hydrogen is reduced to 12.6 standard cubic feet per pound of tar and the average catalyst temperature is 900° F.

The product represents 94% of the hydrocarbon content of the tar and contains not more than ten parts per million of sulfur.

The compositions of the distillates of Examples 1–4 are given in Table 1.

TABLE 1

| | Example 1 | Example 2 | Example 3 | Example 4 |
|---|---|---|---|---|
| Distillate | 70.9% | 81.2% | 78.0% | 74.0% |
| Residue | 29.1% | 18.8% | 22.0% | 26.0% |

Composition of Distillate in Percent of Total Product

| | | | | |
|---|---|---|---|---|
| Benzene | 3.8 | 6.0 | 3.4 | 2.1 |
| Toluene | 17.9 | 27.6 | 21.1 | 20.0 |
| Ethylbenzene | 33.2 | 33.8 | 35.7 | 32.0 |
| Unidentified | 16.0 | 13.8 | 17.8 | 19.1 |

NOTE.—The composition of the distillate is determined by gas chromatography.

Example 5

The procedure of Example 1 is repeated except that the tar is replaced with a feed which is composed of a mixture comprising 70% tar and 30% of the residue from the distillation up to a temperature of 150° C. at 25 mm. mercury of the product of the Friedel-Crafts alkylation of benzene with ethylene. The mixture of feed and hydrogen is passed through the catalyst bed at a rate such that 0.35 pound of feed per pound of catalyst and 24.6 standard cubic feet of hydrogen per pound of feed pass through the reactor. The average catalyst temperature is 1040° F.

The product represents 95% of the hydrocarbon content of the feed and contains not more than ten parts per million of sulfur.

Example 6

The procedure of Example 5 is repeated except that the average catalyst temperature is 825° F.

The product represents 96% of the hydrocarbon content of the feed and contains not more than ten parts per million of sulfur.

Example 7

The procedure of Example 5 is repeated except that Catalyst No. 1 is used, the mixture of feed and hydrogen is passed through the catalyst bed at a rate such that 0.38 pound of feed per pound of catalyst and 24.6 standard cubic feet of hydrogen per pound feed pass through the reactor and the average catalyst temperature is 915° F.

The product represents 92% of the hydrocarbon content of the feed and contains not more than ten parts per million of sulfur.

Example 8

The procedure of Example 7 is repeated except that the average catalyst temperature is 950° F.

The product represents 93% of the hydrocarbon content of the feed and contains not more than ten parts per million of sulfur.

The compositions of the distillates of Examples 5–8 are given in Table 2.

TABLE 2

|  | Example 5 | Example 6 | Example 7 | Example 8 |
|---|---|---|---|---|
| Distillate | 76.8% | 53.7% | 75.0% | 61.7% |
| Residue | 23.2% | 46.3% | 25.0% | 38.3% |
| Composition of Distillate in Percent of Total Product | | | | |
| Benzene | 19.4 | 1.5 | 4.9 | 3.8 |
| Toluene | 24.8 | 9.4 | 16.2 | 11.4 |
| Ethylbenzene | 27.1 | 39.2 | 41.1 | 30.9 |
| Unidentified | 15.1 | 3.6 | 12.8 | 15.7 |

NOTE.—The composition of the distillate is determined by gas chromatography.

Example 9

The procedure of Example 1 is repeated except that Catalyst No. 3 is used. The product represents over 90% of the hydrocarbon content of the tar and contains not more than ten parts per million of sulfur. The distillate consists of more than 50% of the crude product.

Example 10

The procedure of Example 1 is repeated except that Catalyst No. 4 is used. The product represents over 90% of the hydrocarbon content of the tar and contains not more than ten parts per million of sulfur. The distillate consists of more than 50% of the crude product.

The above descriptions and particularly the examples are set forth by way of illustration only. Various changes and modifications in the novel process described herein, such as will be apparent to those skilled in the art, may be made without departing from the spirit and scope of the invention herein disclosed.

What is claimed is:

1. A process for the recovery of valuable aromatic hydrocarbons from the hydrocracking and hydrodesulfurization of a feed stock of vinyl benzene distillation residue containing sulfur in elemental and chemically combined form, saturated and unsaturated polymeric compounds, polyalkyl benzenes and fused ring aromatic compounds, which comprises passing a mixture of the feed stock and hydrogen through a bed of hydrocracking and hydrodesulfurization catalyst, (a) the amount of hydrogen being sufficient to convert substantially all of the free and chemically combined sulfur to hydrogen sulfide and to saturate the hydrocarbon components, (b) passing the feed stock through the catalyst bed at a rate of from about 0.2 to about 3.0 pound per pound of catalyst per hour, (c) maintaining the temperature of the catalyst bed within the range of from about 600° F. to about 1,100° F. and (d) maintaining the pressure of the feed stock and hydrogen within the range of from about 100 to about 500 p.s.i.g.

2. A process according to claim 1 in which the feed stock is a mixture of styrene distillation residue and ethyl benzene distillation residue containing polyalkyl benzene, diphenyl and fused ring aromatic compounds.

3. A process according to claim 2 in which the feed stock is from about 20% to about 80% by weight of styrene distillation residue and the remainder of ethylbenzene distillation residue.

4. A process according to claim 1 in which the catalyst comprises oxides of cobalt, nickel, and molybdenum on an alumina carrier and the atomic ratio of cobalt plus nickel to molybdenum is in the range of 1 to 5 to 1 to 1.

5. A process according to claim 1 in which the catalyst comprises oxides of cobalt and molybdenum on an alumina carrier and the atomic ratio of cobalt to molybdenum is within the range of 1 to 5 to 1 to 1.

6. A process according to claim 1 in which the catalyst comprises oxides of nickel and molybdenum on an alumina carrier and the atomic ratio of nickel to molybdenum is within the range of 1 to 5 to 1 to 1.

7. A process according to claim 2 in which the catalyst comprises oxides of cobalt, nickel, and molybdenum on an alumina carrier in which the amount of cobalt as CoO plus the nickel as NiO is within the range of from about 1 to 5% by weight, the amount of molybdenum as $MoO_3$ is within the range of from about 2 to 50% by weight, and the remainder is alumina.

8. A process according to claim 2 in which the catalyst comprises oxides of cobalt and molybdenum on an alumina carrier in which the amount of cobalt as CoO is within the range of from about 1 to 5% weight, the molybdenum as $MoO_3$ is within the range of from about 2–50% by weight, and the remainder is alumina.

9. A process according to claim 2 in which the catalyst comprises oxides of nickel and molybdenum on an alumina carrier in which the nickel as NiO is present in an amount within the range of from about 1 to 5% by weight, the molybdenum as $MoO_3$ is present in an amount of from about 2 to 20% by weight and the remainder is alumina.

10. A process according to claim 2 in which the catalyst comprises oxides of cobalt, nickel, and molybdenum on an alumina carrier and the atomic ratio of cobalt plus nickel to molybdenum is in the range of 1 to 5 to 1.

11. A process according to claim 2 in which the catalyst comprises oxides of cobalt and molybdenum on an alumina carrier and the atomic ratio of cobalt to molybdenum is within the range of 1 to 5 to 1.

12. A process according to claim 2 in which the catalyst comprises oxides of nickel and molybdenum on an alumina carrier and the aromatic ratio of nickel to molybdenum is within the range of 1 to 5 to 1.

References Cited

UNITED STATES PATENTS

| 3,090,820 | 5/1963 | Walker | 260—667 |
| 3,175,017 | 3/1965 | Meyers | 260—672 |
| 3,340,180 | 9/1967 | Beuther et al. | 208—112 |

DELBERT E. GANTZ, Primary Examiner

A. RIMENS, Assistant Examiner

U.S. Cl. X.R.

708—216; 260—672